United States Patent [19]
Suzuki et al.

[11] Patent Number: 5,678,527
[45] Date of Patent: Oct. 21, 1997

[54] INDUCTION AND CHARGE FORMING SYSTEM FOR GASEOUS FUELED ENGINE

[75] Inventors: Yuichi Suzuki; Minoru Suzuki, both of Iwata, Japan

[73] Assignee: Yamaha Hatsudoki Kabushiki Kaisha, Iwata, Japan

[21] Appl. No.: 555,882

[22] Filed: Nov. 14, 1995

[30] Foreign Application Priority Data

Nov. 14, 1994 [JP] Japan ................. 6-279050

[51] Int. Cl.⁶ ........................... F02M 23/00
[52] U.S. Cl. ............... 123/702; 123/527; 123/439
[58] Field of Search ..................... 123/527, 702, 123/439; 48/144

[56] References Cited

U.S. PATENT DOCUMENTS

| | | | |
|---|---|---|---|
| 3,843,338 | 10/1974 | Zonker et al. | 123/527 |
| 4,063,905 | 12/1977 | Johnson et al. | 123/527 |
| 4,531,300 | 7/1985 | Selvidge et al. | 123/527 |
| 4,545,345 | 10/1985 | Pagdin et al. | 123/527 |
| 4,594,990 | 6/1986 | Batchelor | 123/527 |
| 4,686,951 | 8/1987 | Snyder | 123/527 |
| 4,843,558 | 6/1989 | Bergmann et al. | 123/527 |
| 5,293,856 | 3/1994 | Press et al. | 123/527 |
| 5,337,722 | 8/1994 | Kurihara | 123/527 |

FOREIGN PATENT DOCUMENTS

61-218758  9/1986  Japan ..................... 123/527

*Primary Examiner*—Erick R. Solis
*Attorney, Agent, or Firm*—Knobbe, Martens, Olson & Bear LLP

[57] ABSTRACT

An improved, compact multiple barrel charge forming device for operating with gaseous fuels and which employs a single fuel chamber for supplying fuel to both barrels. A number of various manifolding arrangements are disclosed to facilitate application with multiple cylinder engines and, particularly, those having V arranged cylinder banks.

14 Claims, 9 Drawing Sheets

INDUCTION AND CHARGE FORMING SYSTEM FOR GASEOUS FUELED ENGINE

BACKGROUND OF THE INVENTION

This invention relates to an induction and charge forming system for a gaseous fueled engine and more particularly to an improved, compact mixing device and induction system for multiple cylinder, gaseous fueled engines.

In the interest of conserving natural resources, it has been proposed to operate internal combustion engines utilizing gaseous rather than liquid fuels. In addition to the environmental and natural resource concerns, the use of gaseous fuels in engines has been found to provide longer engine life and longer service intervals. The gaseous fuel does not cause certain deposits and contamination in the engine which may occur with liquid fuels.

In order to provide the requisite fuel air mixture for the cylinders of the engine for combustion, it is the normal practice to utilize a charge former much like a carburetor. These charge formers mix the gaseous fuel with air and deliver it to the engine for combustion.

As is well known, the fuel is normally stored as a liquid under high pressure. The fuel is then delivered through one or more stages of pressure regulation to the charge former where the mixing occurs. Where there are supplied multiple cylinders for the engine, a single charge former may not adequate to supply all of the needs of all cylinders. However, where multiple charge formers are provided, it is essential to ensure that the gaseous fuel delivered to each charge former is at the same pressure.

In addition, by utilizing multiple charge formers, the overall engine construction becomes more complicated and, therefore, the spatial requirements can present certain problems.

It is, therefore, a principal object of this invention to provide an improved charge former and induction system for a multiple cylinder engine operating on gaseous fuel.

It is a further object of this invention to provide a charge former for an internal combustion engine that is designed to operate on gaseous fuel and wherein a plurality of fuel air mixing passages are all served by a common fuel chamber in which the gaseous fuel is delivered for mixing purposes.

With certain types of engine configurations the induction and charge-forming system can be somewhat complicated. This is particularly true with engines having cylinder banks that are disposed at an angle to each other such as V-type or opposed engines. This type of engine normally requires a separate manifolding arrangement for each bank of the cylinders and, thus, the problems aforenoted when utilizing gaseous fuel are magnified.

It is, therefore, a still further object of this invention to provide an improved charge former and induction system for an engine having angularly related cylinder banks.

SUMMARY OF THE INVENTION

This invention is adapted to be embodied in a two-barrel, gaseous fueled carburetor for an internal combustion engine. The carburetor is comprised of a housing assembly that defines a pair of side-by-side induction passages. A gaseous fuel chamber is formed in the housing assembly between the induction passages. First and second fuel metering systems each communicate the gaseous fuel chamber with a respective one of the induction passages for delivery of gaseous fuel thereto for mixing with air flowing therethrough.

DETAILED DESCRIPTION OF THE PREFERRED EMBODIMENTS OF THE INVENTION

Figure 1:
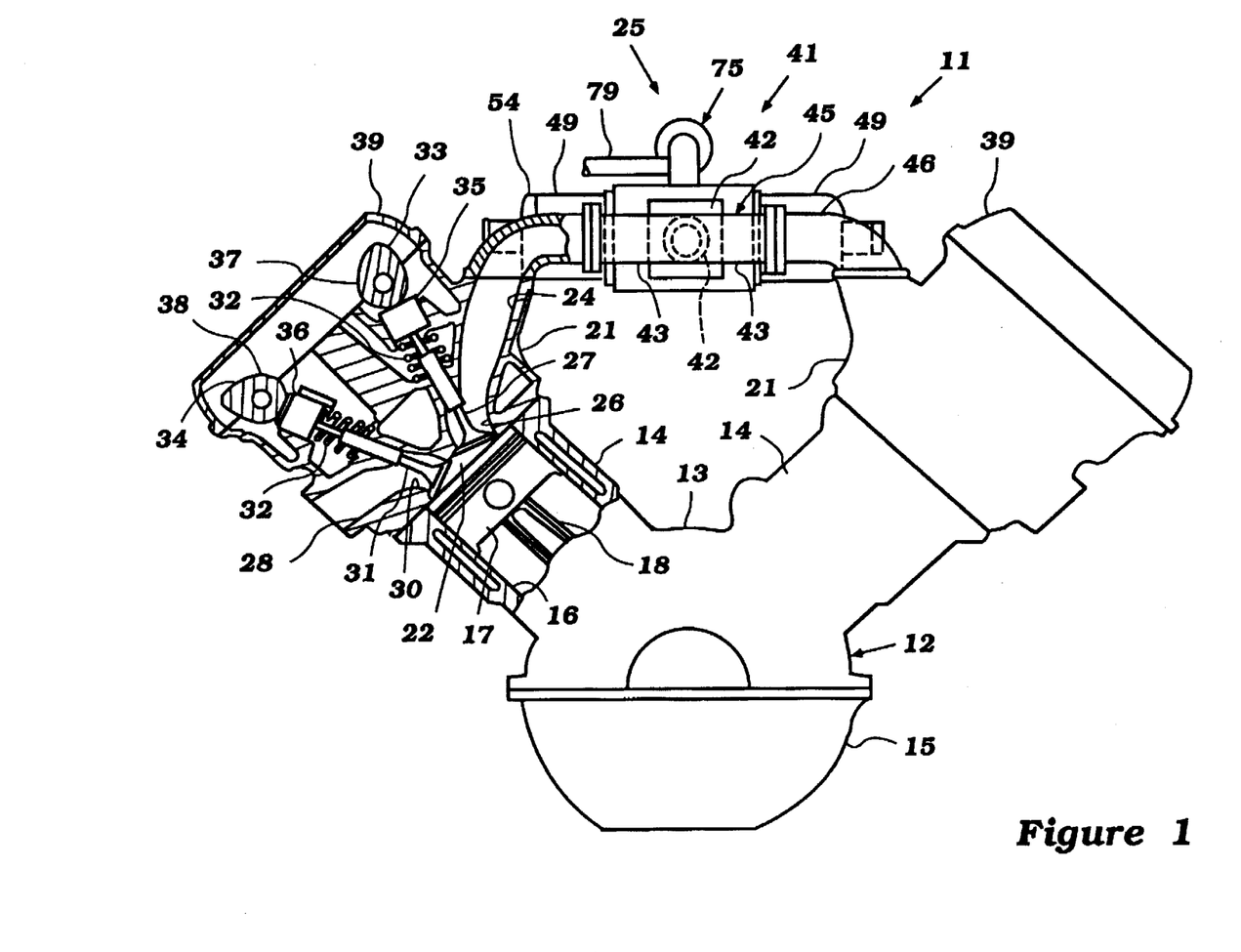
FIG. 1 shows a front elevational view of an internal combustion engine constructed in accordance with an embodiment of the invention and with a portion broken away and shown in section.
Figure 2:
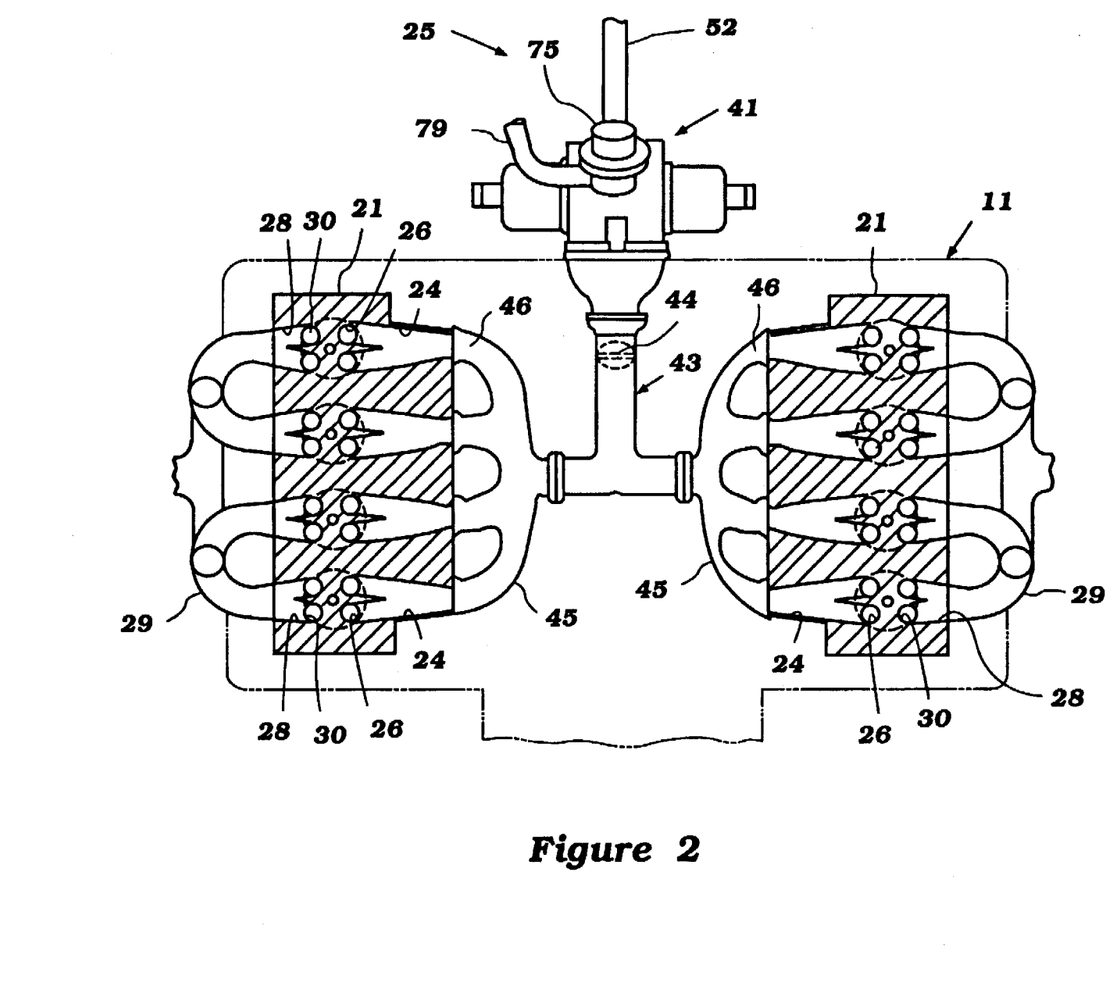
FIG. 2 shows a top plan view of the engine of FIG. 1, with the engine block shown in phantom.

Referring now in detail to the drawings and initially to FIGS. 1 and 2, a four-cycle internal combustion engine constructed in accordance with an embodiment of the invention is identified generally by the reference numeral 11. The engine 11 may be a V-type engine or an opposed engine and may have any number of cylinders.

The engine 11 is provided with a cylinder block crankcase assembly, indicated generally by the reference numeral 12, and composed of a cylinder block 13 with cylinder banks 14 and a crankcase member 15. The crankcase member or oil pan 15 is attached to the undersurface of the cylinder block 13 by any suitable means and serves as the oil reservoir for the engine.

The cylinder banks 14 are provided with cylinder bores 16 in which piston 17 reciprocate. Each piston 17 is pivotally connected by means of a piston pin (not shown) to the small end of the connecting rod 18. The big end of the connecting rod 18 is journaled on the throw of a crankshaft (not shown) which is rotatably journaled within a crankcase member 15.

A pair of cylinder head assemblies, indicated generally by the reference numeral 21, are affixed to the upper surfaces of the cylinder banks 14 in any well-known manner. The cylinder heads 21 have recesses 22 formed in their lower surfaces, above which are positioned spark plugs (not shown). The recesses 22 align with the cylinder bores 16 and the head of the piston 17 to form the individual combustion chambers of the engine 11. The recesses 22 can be referred to as the combustion chambers, since at top dead center (TDC) their volume comprises the major portion of the clearance volume.

A pair of intake passages 24 extend through one side of each cylinder head 21 and are served by an induction and charge-forming system 25, which will be described in detail later. The intake passages 24 terminate at their inner side at a pair of valve seats 26 which are each controlled by a separate intake valve 27.

In a similar manner, a pair of exhaust passages 28 extend through the opposite side of each cylinder head 21 and serve exhaust manifolds 29. The exhaust passages 28 terminate in respective valve seats 30 which are controlled by a pair of exhaust valves 31.

The intake and exhaust valves 27 and 31, respectively, are operated by respective valve springs 32 and cam lobes 33 and 34 through respective valve tappets 35 and 36. The cam lobes 33 and 34 form a portion of respective overhead camshafts 37 and 38 that are journaled for rotation in the cylinder head 21 in a known manner. Affixed to one end of the camshafts 37 and 38 are sprockets (not shown) which are driven at one-half engine speed by a crankshaft sprocket (not shown) affixed to the crankshaft and in communication with the camshaft sprockets via a cam belt or chain (not shown). The cylinder heads 21 are fully enclosed by cam covers 39 mounted above the overhead camshafts 37 and 38.

Since, except for the induction and charge forming system 25, the engine 11 may be of any conventional type further description of it is not necessary to enable those skilled in the art to practice the invention.

The induction and charge-forming assembly 25 will now be described in detail with reference to FIGS. 2–10. The induction and charge-forming assembly 25 is comprised of a charge former 41, namely, a carburetor that is of a double-barrel-type configuration and connects at its lower end to a two-into-one collector pipe 42. The collector pipe 42 is connected at its lower end to an intake manifold inlet pipe 43 in which is positioned a throttle valve 44. As best seen in FIG. 2, the manifold inlet pipe 43 forms left and right branches at its lower end, which join to left and right respective intake manifolds 45 whose runners 46 in turn connect to respective intake passages 24 in the cylinder heads 21 of the engine 11.

The carburetor 41 will now be described in detail with reference to FIGS. 3–10. The carburetor 41 consists of a housing 47 in which are disposed two induction passages or barrels 48. A fuel metering chamber 49 is positioned in the middle of the housing 47 between the induction passages 48. A fuel nozzle 51 is disposed along the top surface of the metering chamber 49 and sealingly engages a gaseous fuel supply conduit 52 for supplying fuel to the metering chamber 49. The gaseous fuel supply conduit 52 receives a supply of gaseous fuel from a pressurized fuel tank (not shown) where the fuel is stored as a liquid. This liquid fuel is delivered to the gaseous fuel supply conduit 52 through one or more stages of pressure regulation (not shown) where the fuel is changed from a liquid state to a gaseous state at a pressure slightly below atmospheric.

The carburetor comprises a pair of fuel metering circuits (FIGS. 3 and 4) comprising a pair of fuel metering jets 53 each of which opens to a respective one of the induction passage 48 from the metering chamber 49. These metering jets 53 are disposed on opposite sides of the metering chamber 49 in a staggered relationship with one another. As may be seen best in FIGS. 4 and 10 the stagger is indicated by the dimension "a". This staggering permits a more compact construction while still permitting the use or relatively long metering rods, as will be described.

Figure 3:
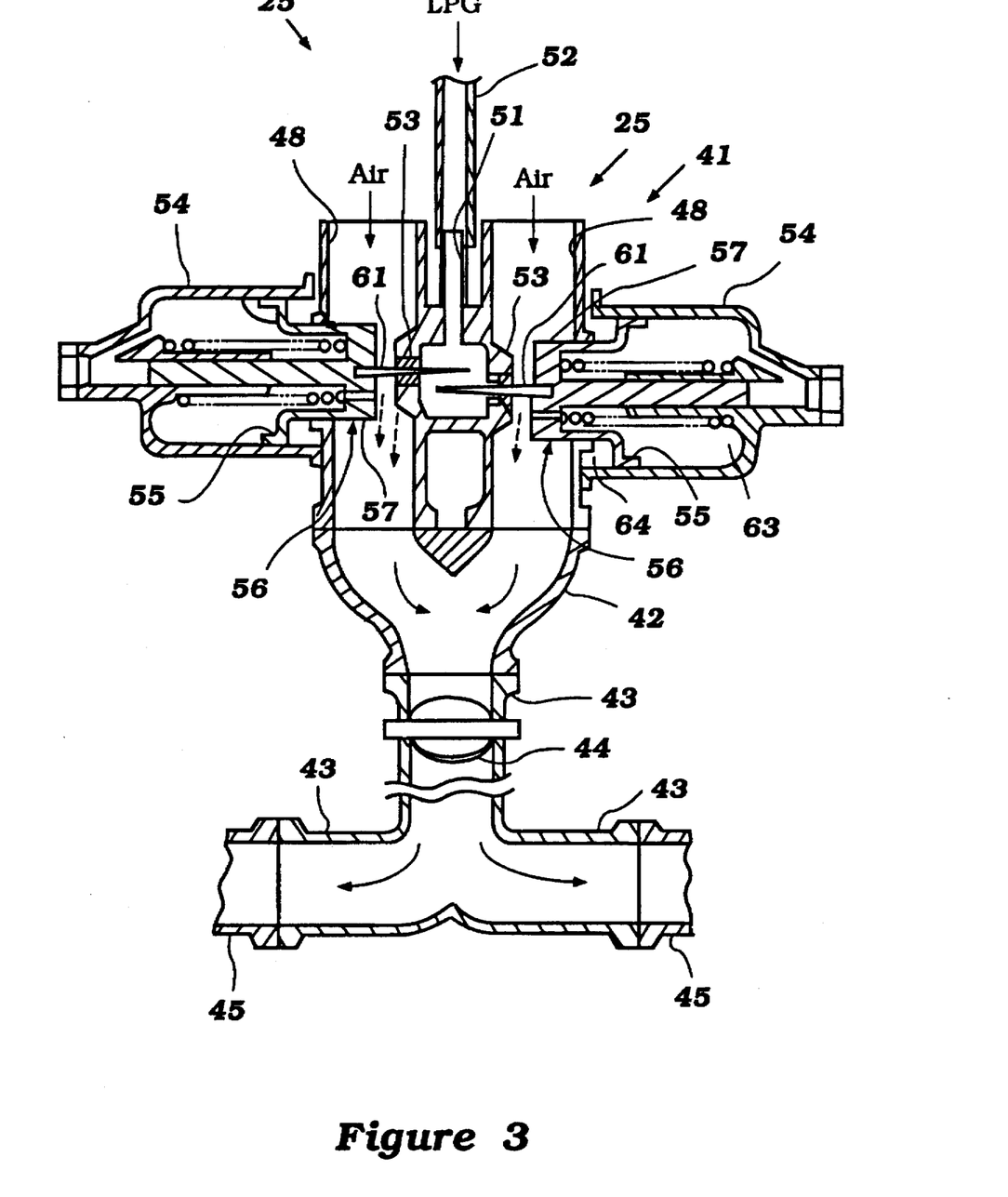
FIG. 3 shows a cross-sectional view of the induction and charge forming assembly.
Figure 4:
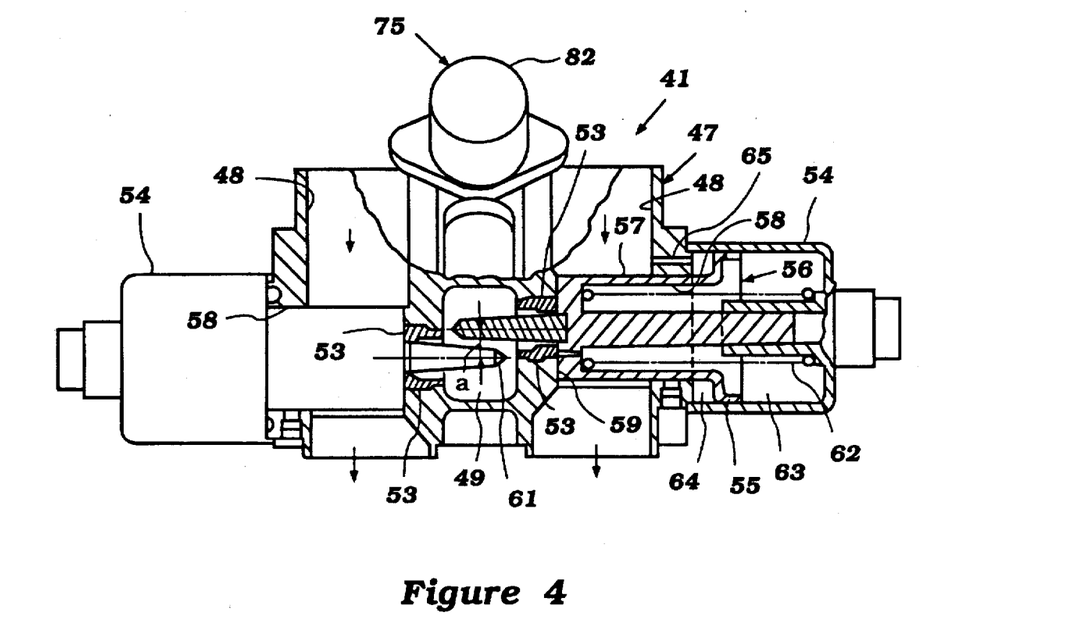
FIG. 4 shows a top plan view of the carburetor with a portion of the top surface removed to illustrate the relative positioning of various internal components.
Figure 5:
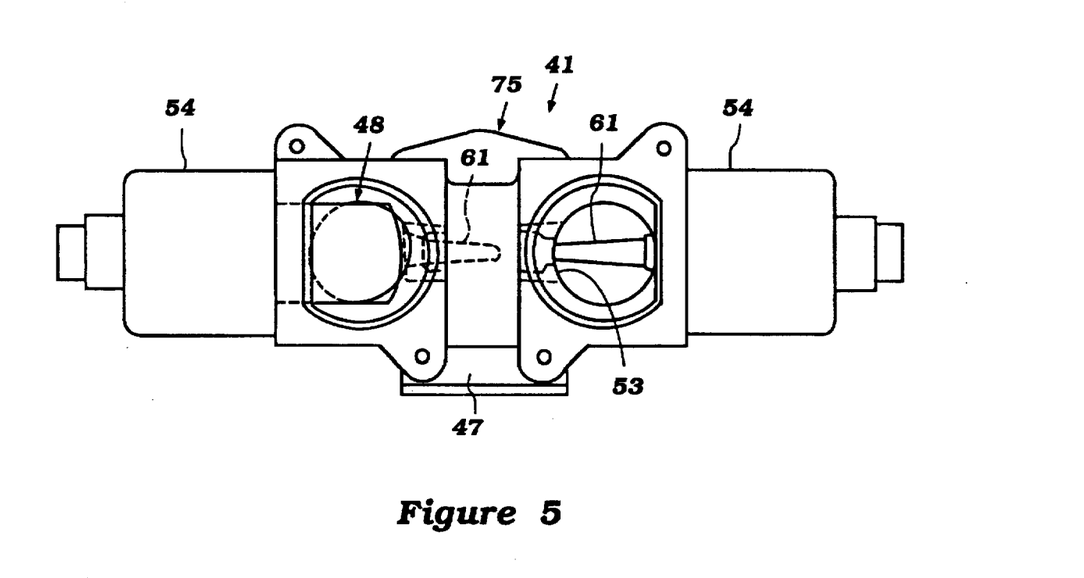
FIG. 5 shows a rear elevational view of the carburetor, with some of the internal components shown in phantom.
Figure 6:
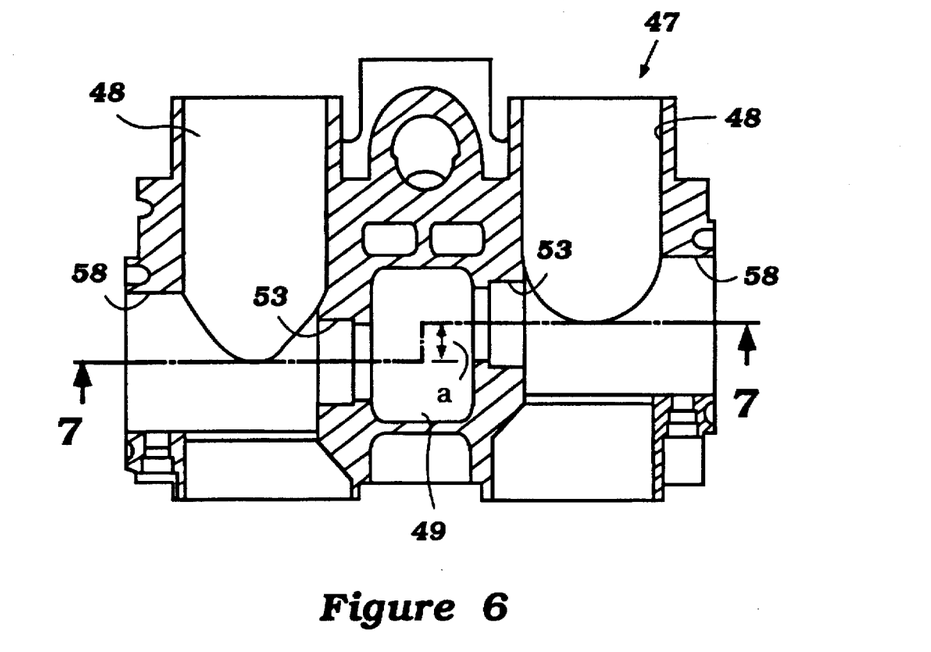
FIG. 6 shows a cross-sectional view of the carburetor housing.
Figure 7:
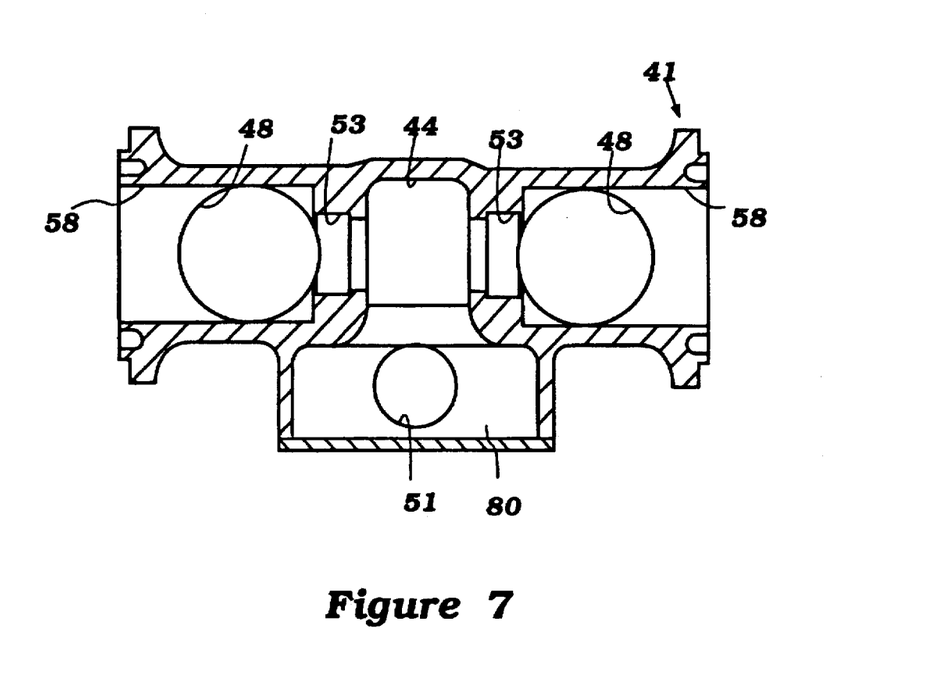
FIG. 7 shows a cross-sectional view of the carburetor housing taken along the line 7—7 in FIG. 6.
Figure 8:
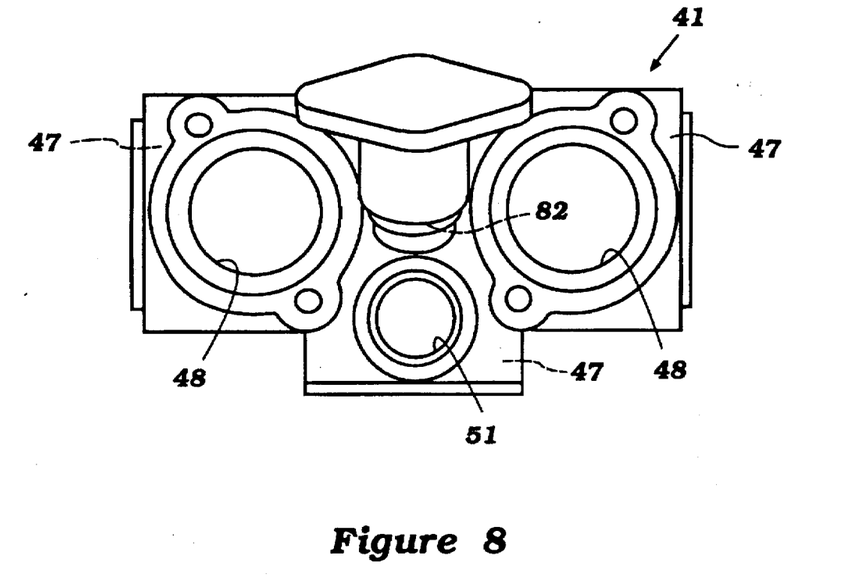
FIG. 8 shows an enlarged front elevational view of the body of the carburetor.

Affixed to the outside surface of each induction passage 48 is a metering assembly which is comprised of a housing 54 in which is slidably and sealingly journaled a larger diameter portion 55 of a piston 56. The piston 56 has a smaller diameter portion 57 that extends through an opening 58 in the carburetor body into the induction passage 48 in such a manner as to sealingly engage the housing 47 while still being able to slide into and out of the induction passage 48 in varying degrees.

A tapered metering rod 61 is affixed at its base to the head 57 of the piston 56 and extends through the fuel metering jet 53 into the fuel metering chamber 49 to a degree which is dependent upon the position of the piston 56 within the intake passage 48. A spring 62 is mounted inside the housing 54 in a volume 63 formed between the housing 54 and the lower surface of the piston portion 57 and tends to resist inward motion of the piston 56 relative to the housing 47.

The volume 63 communicates with the induction passage 48 downstream of the piston portion 57 through a drilled passage 59 in the piston portion 57. A further volume 64 formed between the housing 54 and the side of the piston portion 55, outside surface of the induction housing 47 communicates to the atmosphere or pressure on the upstream side of the piston portion 57 through a drilled passage 65 in the carburetor body 47. In this manner the position of the piston 56 within the induction passage 48, and thus the degree by which the metering rod 61 constricts the metering jet 55, is determined by the pressure gradient between the upstream and downstream sides of the piston 56 to maintain a substantially constant pressure drop in the carburetor 41.

The carburetor 41 operates as follows. Air is drawn through the carburetor 41 when a piston 17 is in the intake stroke portion of its motion. The air flow rate is determined by the vehicle operator, who controls the angle at which the throttle valve 44 is opened in the intake manifold inlet pipe 43. The air being drawn through the carburetor's induction passages 48 is at a lower pressure than the atmospheric air, and thus the gaseous fuel flows from the metering chamber 49 through the metering jets 53 through an area the size of which is controlled by the metering rods 61. This fuel is then mixed with the air.

The low pressure of the air in the induction passages 48 is directly communicated to the first metering chamber volume 63, while at the same time the atmospheric pressure is communicated to the second metering chamber volume 64 as aforenoted. Increased air flow causes the piston 55 to move further into the chamber 63 and the metering rods 61 further out of the metering jets 55. Thus, it is readily apparent that the metering rods 61 constrain the gaseous fuel flow in lesser degree for increasing air flow. In this manner the desired mixture ratio can be maintained for all throttle positions and associated engine speeds.

For finer tuning of the air fuel ratio and/or to adjust for variations in the caloric content of the fuel employed there is provided an air bleed mixing mechanism. This mechanism will now be described with reference to FIGS. 2, 4, 8, 9, and 10.

Figure 9:
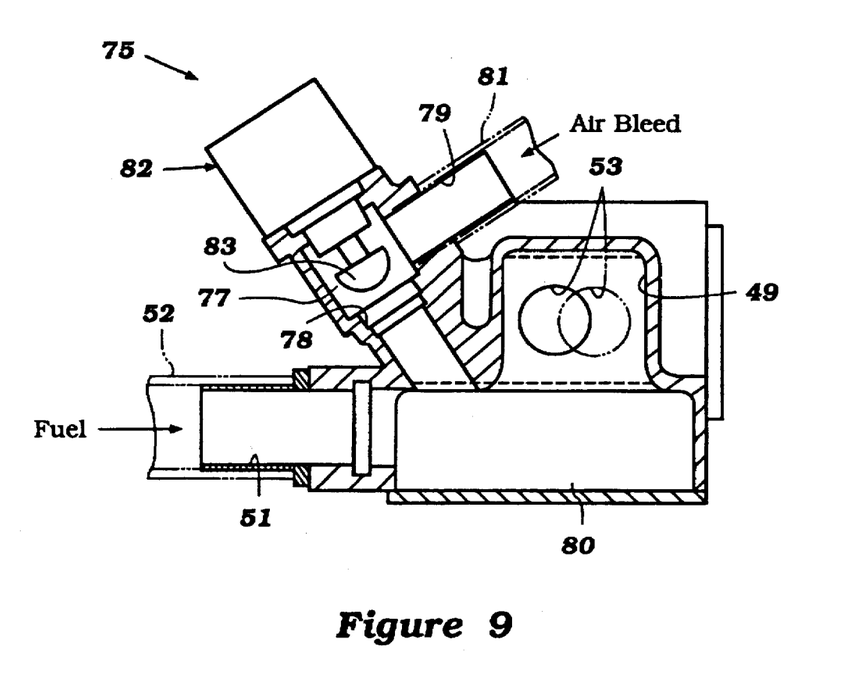
FIG. 9 shows a cross-sectional view of the bleed-air assembly for the carburetor.
Figure 10:
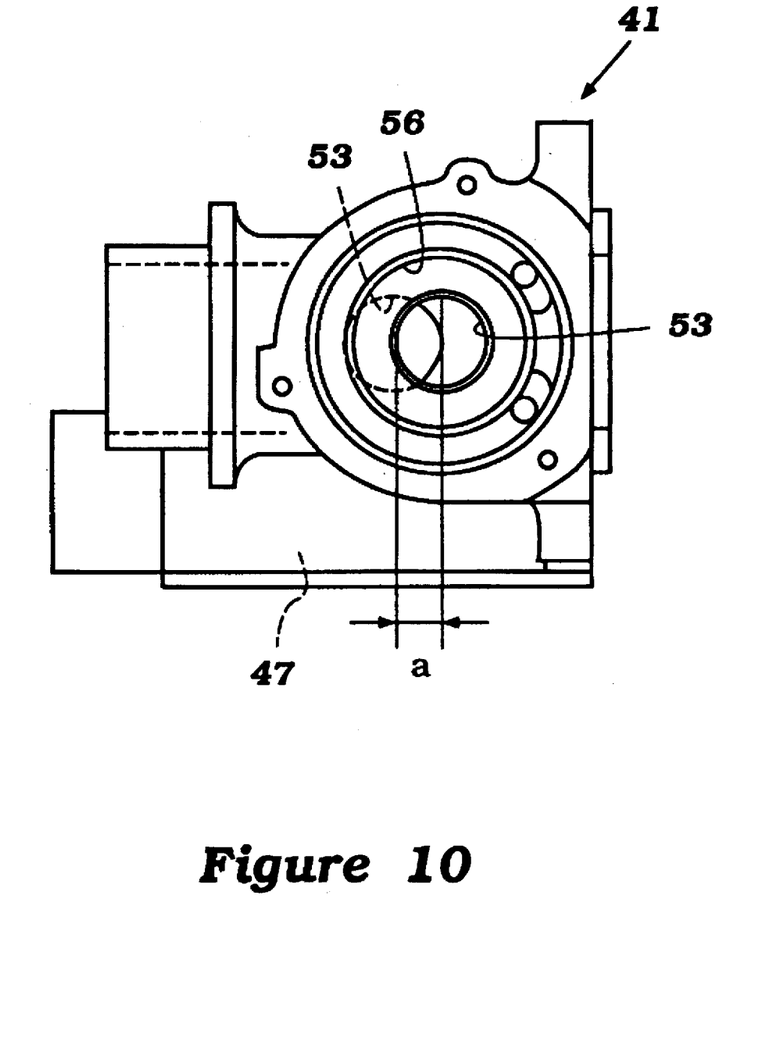
FIG. 10 shows an enlarged side elevational view of the carburetor with the metering assembly removed.

A bleed-air assembly 75 is disposed along an edge of the top surface of the carburetor housing 47 between the induction passages 48 and adjacent the fuel metering chamber 49. As best seen in FIG. 9, the bleed-air assembly 75 consists of a bleed-air chamber 77 formed integrally in the carburetor housing 47. An air intake passage 78 is formed at the lower surface of the bleed-air chamber 77 and intersects a chamber 80 which receives the gaseous fuel from the carburetor fuel inlet nozzle 51 at its lower end.

A bleed-air inlet passage 79 is connected to the bleed-air chamber 77 upstream of the passage 78. The bleed-air passage is connected at its upper end through a conduit 81 to a source of atmospheric air. This may be, for example, through the air inlet device or air cleaner of the engine which also supplies the air to the induction passages 48 of the carburetor 41 down stream of its air filter (not shown).

An electric stepping motor 82 is positioned on the top surface of the carburetor housing 47 and drives a bleed-air valve 83 which passes into the bleed-air chamber 77.

The electric stepper motor 82 is automatically controlled by a closed-loop feedback control system (not shown), which utilizes an $O_2$ sensor (not shown) positioned downstream of the exhaust manifolds 29 to communicate to an ECU a signal indicative of the air-fuel ratio status. The ECU then signals the stepper motor 82, which positions the bleed valve 83 in the air bleed chamber 77 in proximity to the bleed-air intake passage 78. In this manner the valves 83 may partially or even fully restrict bleed-air flow, which enters the bleed-air chamber 77 from the inlet 79 into the carburetor inlet nozzle 51 via the intake passage 78. Thus, in this closed-loop feedback system the amount of air which bleeds into the inlet nozzle 51 is consistent with the amount necessary to provide an ideal stoichiometric mixture or such ratio as desired for the combustion, as determined by the ECU and the control routine thereof.

Figure 11:
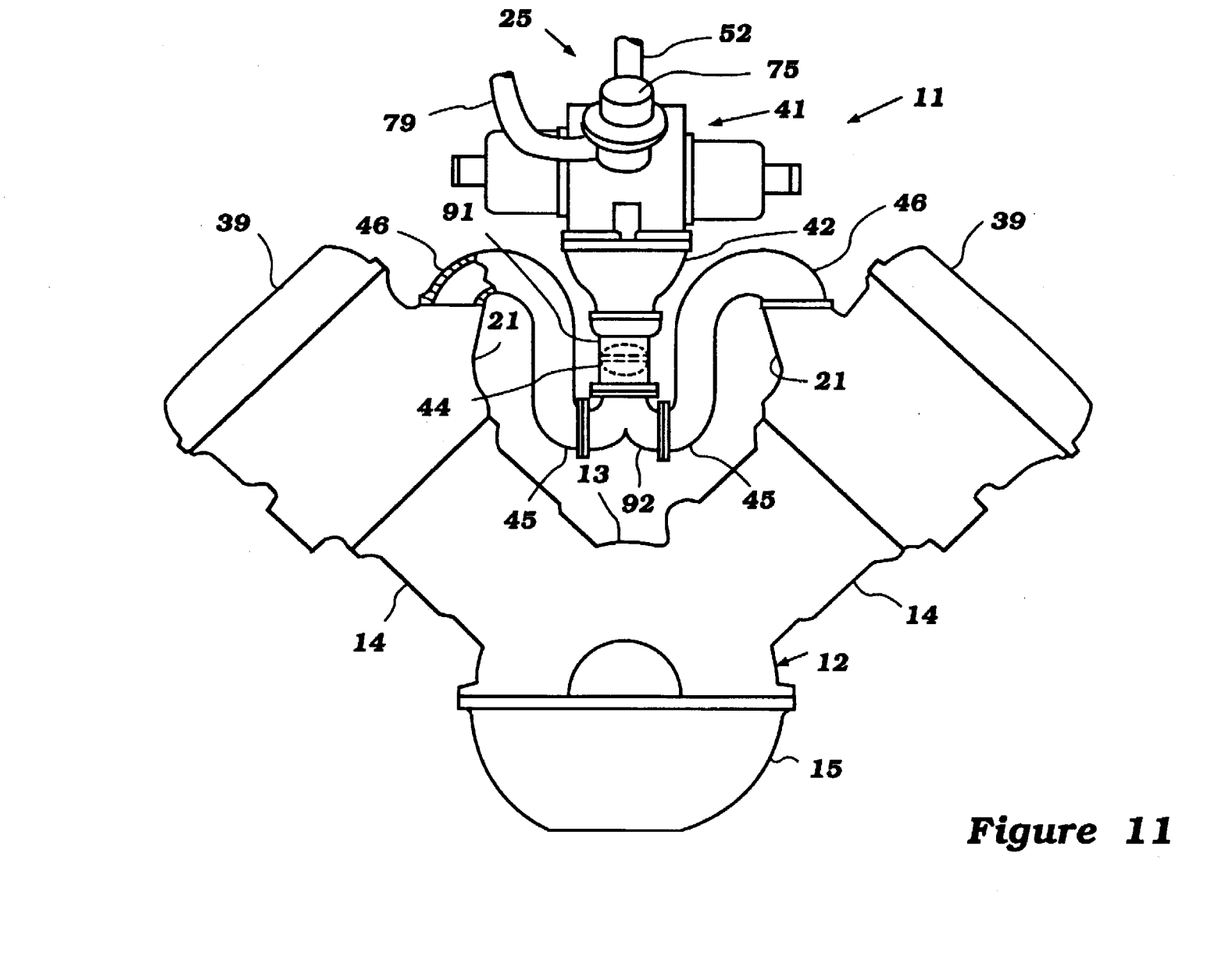
FIG. 11 shows a front elevational view of an engine, in part similar to FIG. 1, and illustrates a further embodiment of the invention.
Figure 12:
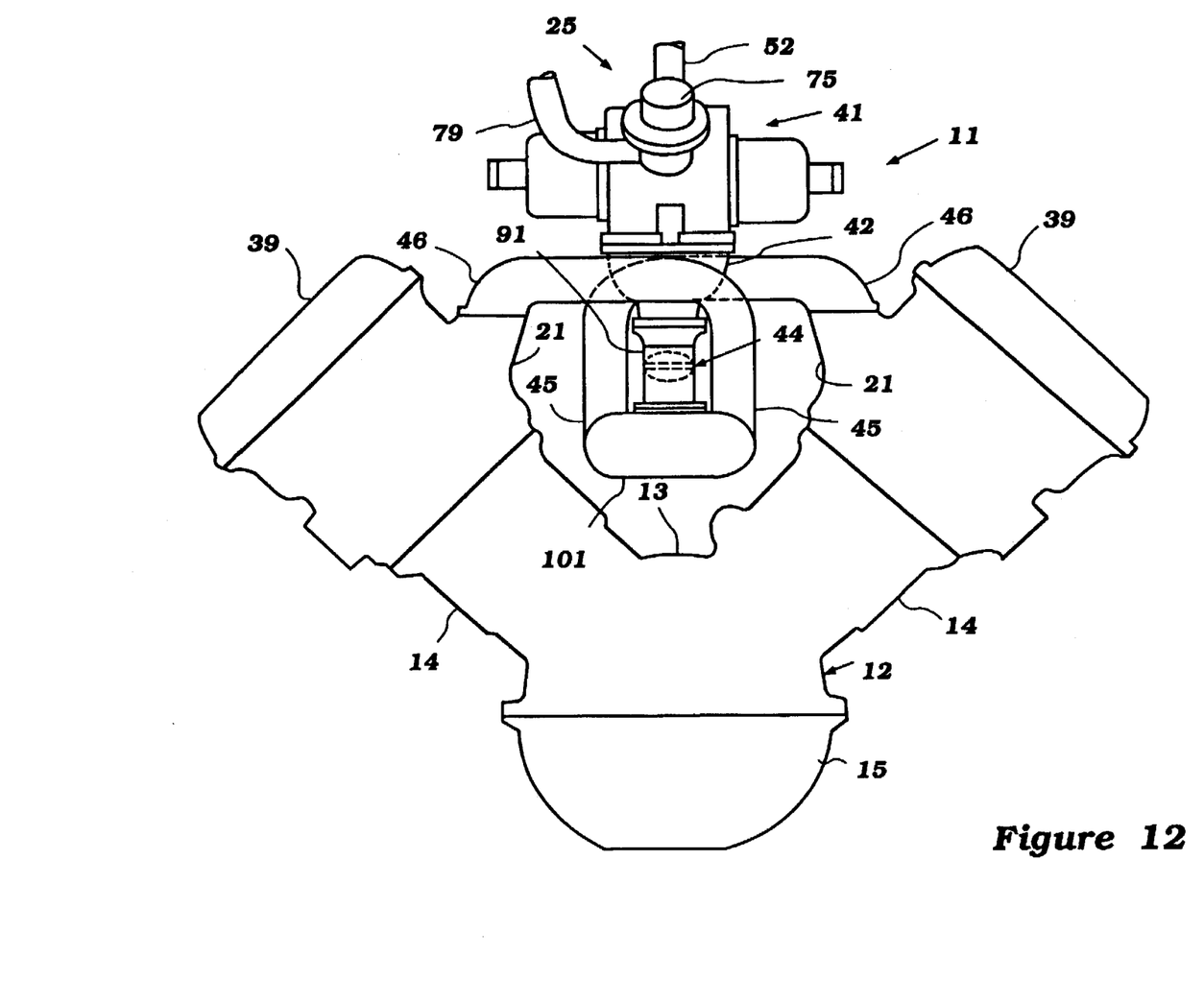
FIG. 12 shows a front elevational view of an engine, in part similar to FIG. 11, and illustrates a further embodiment of the invention.

FIGS. 11 and 12 illustrate further embodiments of the invention in which various intake manifold configurations and carburetor orientations are utilized. In the embodiment thus far described the carburetor 41 was placed beyond the valley between the cylinder banks 14 and was disposed to act as a cross flow device. This presents a low hood line but may increase the length of the engine package. In the next to be described embodiments the carburetor 41 is positioned to act as a down flow device and is positioned in the valley between the cylinder banks. Thus the engine package is shortened.

Referring now to the embodiment of FIG. 11, the induction and charge-forming assembly 25 is mounted along a vertical axis and extends into the valley between the cylinder banks 14. The intake manifold inlet pipe 43 is divided into upper and lower portions 91 and 92, respectively. The upper portion 91 in which is positioned the throttle valve 44 connects at its upper end to the collector pipe 42 and at its lower end to the top of the manifold inlet pipe lower portion 92.

The manifold inlet pipe lower portion 92 forms left and right branches at its lower end that join to the left and right respective intake manifolds 45. The intake manifolds 45 now consist of runners 46 which are elongated and extend upward from the intake manifold's junction with the manifold inlet pipe lower portion 92 to connect to the cylinder head intake passages 24. The reentrant shape of the manifold runners 46 permits the desired length and also keeps the overall height low because the carburetor 41 can be nested between the respective runners 46 of the manifolds 45. The carburetor 41 has the same construction as already described.

In the embodiment illustrated in FIG. 12, the manifold inlet pipe lower portion 92 of the previous embodiments has been replaced by a plenum chamber 101 which connects to the lower end of the inlet pipe upper portion 91. The intake manifold runners 46 are independently affixed to the upper outer surface of the plenum 101 and extend upwards until they are in vertical alignment with the collector pipe 42. The runners 46 then cross over to the opposite sides of the induction and charge-forming assembly 25 and connect to the cylinder head intake passages 24. Thus, it is apparent that the runners 46 provided in this embodiment are greatly elongated, which allows the air-fuel charge to form a more homogenous mixture and may provide the desired tuning effect to improve charging From the foregoing description, it should be readily apparent that the described charge former permits the formation of a charge for an engine having a number of cylinders while maintaining a relatively simple construction and one which is very compact. In addition, the manifolding system utilized with this charge former specially adapts for use with engines having opposed cylinder banks such as V-type engines. Of course, the foregoing description is that of the preferred embodiments of the invention and various changes and modifications may be made without departing from the spirit and scope of the invention, as defined by the appended claims.

What is claimed is:

1. A two-barrelled gaseous fueled carburetor for an internal combustion engine comprised of a housing assembly defining a pair of side-by-side induction passages having parallel flow paths, a gaseous fuel chamber formed in said housing assembly in the area between said induction passages, and first and second fuel metering systems each communicating said gaseous fuel chamber with a respective one of said induction passages for delivery of gaseous fuel thereto for mixing with air flowing therethrough, said first and second fuel metering systems being axially offset relative to each other in the direction of flow through the induction passages, said first and second fuel metering systems comprising a pair of metering jets each communicating the gaseous fuel chamber with a respective one of the intake passages, metering rods cooperating with said metering jets for controlling the effective flow area thereof, said metering rods being affixed to slidably supported pistons movable in the respective induction passage to maintain a substantially constant drop thereacross, said pistons extending transversely outwardly from the respective of said induction passages from said gaseous fuel chamber.

2. A two-barrelled gaseous fueled carburetor as set forth in claim 1, further including means for bleeding air into the gaseous fuel chamber for controlling the strength of the mixture therein.

3. A two-barrelled gaseous fueled carburetor as see forth in claim 2, wherein there is a single air bleed for the gaseous fuel chamber.

4. A two-barrelled gaseous fueled carburetor as set forth in claim 1 in combination with a multiple cylinder engine, including an intake manifold communicating the induction passages with cylinders of said engine.

5. A combination as set forth in claim 4, further including a throttle valve in the intake manifold downstream of the carburetor.

6. A combination as set forth in claim 5, wherein a single throttle valve controls the flow through both of the carburetor induction passages.

7. A combination as set forth in claim 5, wherein the single throttle valve is disposed downstream of the fuel metering systems.

8. A combination as set forth in claim 4, wherein the engine cylinders are formed in a least two angularly related cylinder banks disposed at a V angle to each other.

9. A combination as set forth in claim 8, wherein the induction passages extend in a generally longitudinal direction relative to the V angle of the cylinder banks.

10. A combination as set forth in claim 9, wherein the carburetor is disposed at one end of the engine and out of the valley between the cylinder banks.

11. A combination as set forth in claim 8, wherein the induction passages of the carburetor extend in a vertical direction relative to the associated cylinder banks.

12. A combination as set forth in claim 11, wherein the carburetor is positioned in the valley between the cylinder banks.

13. A combination as set forth in claim 12, wherein the intake manifold comprises a pair of branch sections extending from a lower position in the valley where they receive the charge from the carburetor upwardly and outwardly to enter the cylinder banks.

14. A two-barrelled gaseous fueled carburetor as set forth in claim 13, wherein the upwardly extending portions of the intake manifold cross over each other so as to serve opposite cylinder banks.

* * * * *